Figure 1:
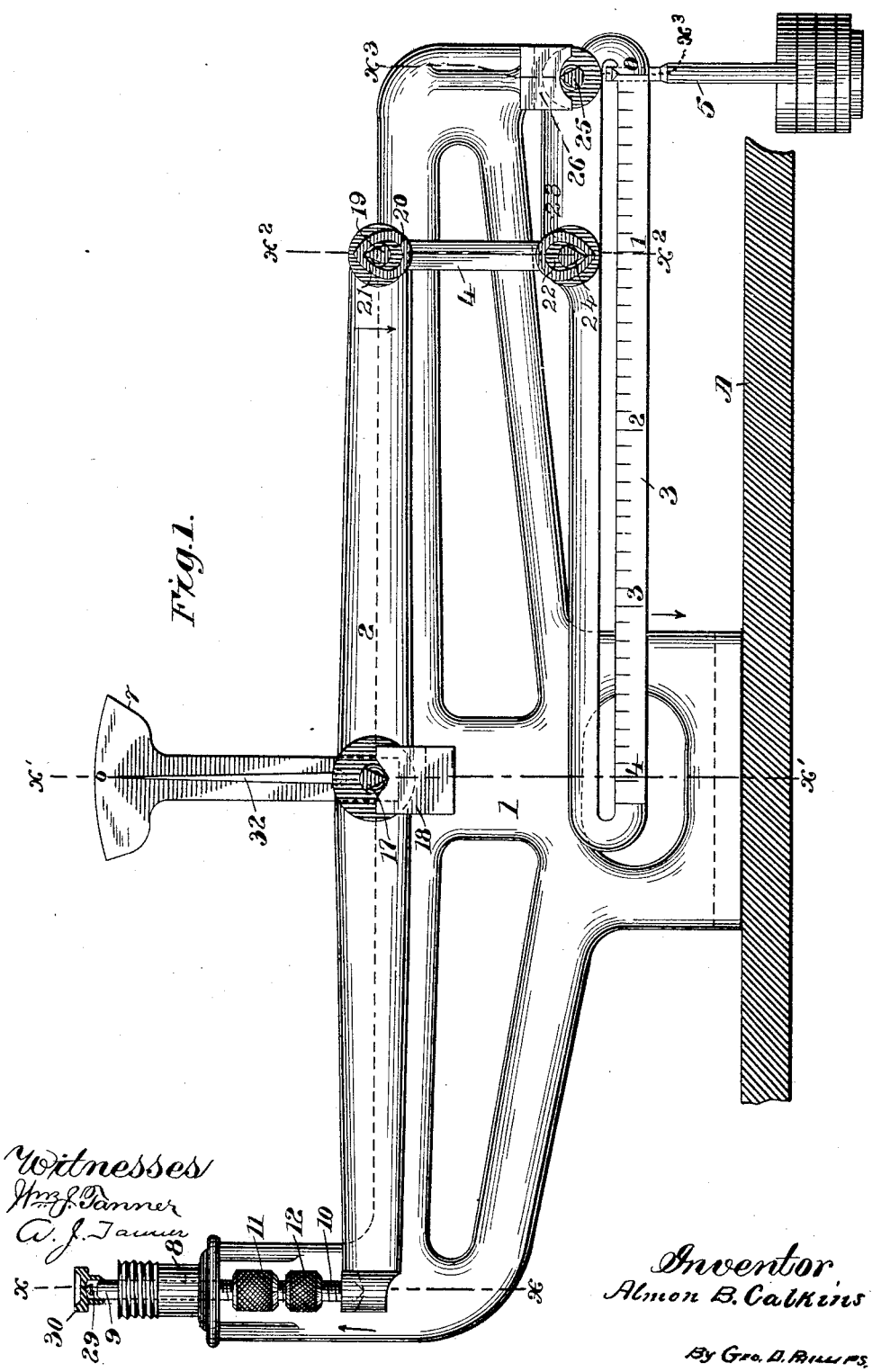

(No Model.)

A. B. CALKINS.
SPRING TESTING DEVICE.

No. 450,989. Patented Apr. 21, 1891.

Witnesses
Wm. F. Tanner
A. J. Tanner

Inventor
Almon B. Calkins

By Geo. D. Phillips (No Model.) 2 Sheets—Sheet 2.
A. B. CALKINS.
SPRING TESTING DEVICE.
No. 450,989. Patented Apr. 21, 1891.
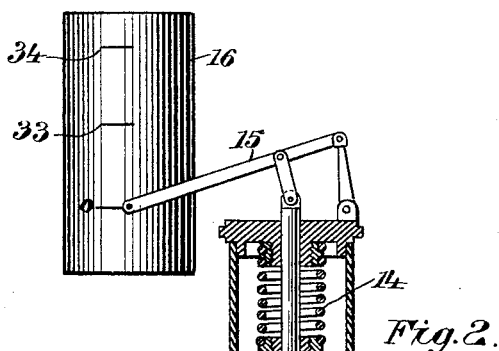
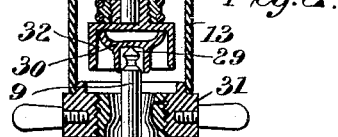
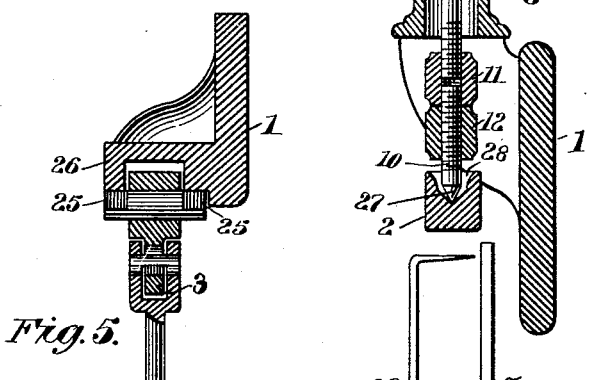
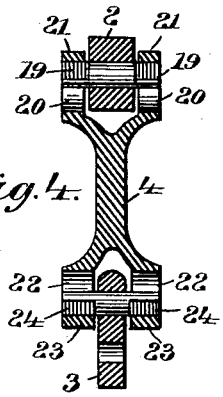
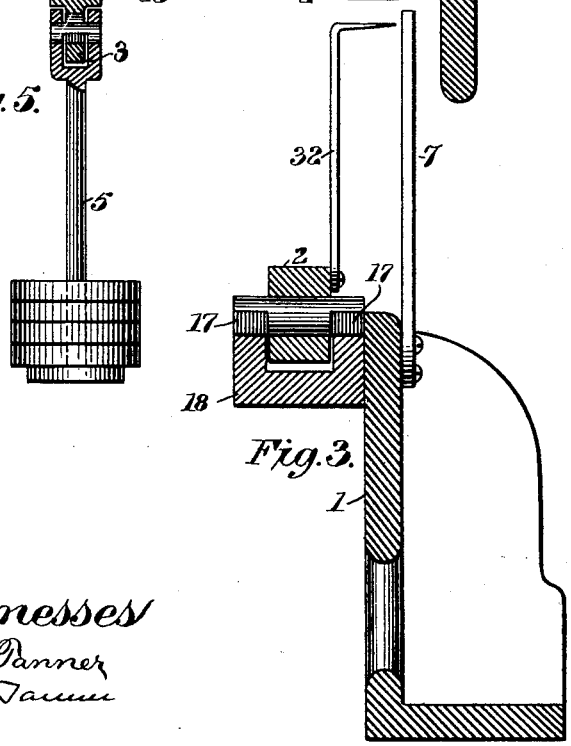
Witnesses
Inventor
Almon B. Calkins
By Geo. A. Phillips

UNITED STATES PATENT OFFICE.

ALMON B. CALKINS, OF NEW YORK, N. Y., ASSIGNOR OF ONE-HALF TO FERRAL C. DININNY, JR., OF SAME PLACE.

SPRING-TESTING DEVICE.

SPECIFICATION forming part of Letters Patent No. 450,989, dated April 21, 1891.

Application filed July 3, 1890. Serial No. 357,601. (No model.)

*To all whom it may concern:*

Be it known that I, ALMON B. CALKINS, a citizen of the United States, and a resident of New York, in the county of New York and State of New York, have invented certain new and useful Improvements in a Spring-Testing Device, of which the following is a specification.

My invention relates to a device for obtaining by means of a system of dead-weights the exact denomination of the springs used in a steam-engine indicator. The properties of steam-engine indicator-springs are such that it is necessary to know their previous condition before accurate calculations can be made from the results of their use.

My invention consists in the combination of a balance-beam with a scale-beam carrying a weight-holder, so that the compound leverage of the beams are caused to act on an indicator-spring, by means of which the true value of such spring may be determined.

My invention further consists in certain novel features of construction whereby the balance-beam is brought into engagement with an indicator-spring, all of which improvements will be fully described in the specification, and particularly pointed out in the claims.

To more fully understand my invention reference is had to the accompanying drawings, forming a part of this specification.

Figure 1 represents a side elevation of the device, showing the balance-beam, scale-beam, and frame supporting such beams, and the means employed to bring the balance-beam into engagement with an indicator-spring, consisting of an indicator-support as part of the beam and projecting above the same, a plunger or pressure rod having adjusting-nuts thereon connecting the balance-beam with an indicator-spring. Fig. 2 represents a sectional view of the indicator-support and a sectional view of an indicator mounted thereon, also sectional view of the adjusting and lock nuts, an end of the balance-beam and frame through line X of Fig. 1, and also a view of an indicator-drum. Fig. 3 represents a sectional end elevation of the frame, balance-beam, and fulcrum-support through line X' of Fig. 1; also, full view of the fulcrum-pin of the balance-beam, and also dial-plate and balance-finger of the beam. Fig. 4 represents a sectional view of the balance and scale beams and connecting-link of such beams through line $X^2$ of Fig. 1. Fig. 5 represents the weight-holder, a sectional view of the frame and scale-beam, and upper part of the holder through line $X^3$ of Fig. 1.

Its construction and operation are as follows:

1 represents the frame; 2, the balance-beam; 3, the scale-beam; 4, link connecting such beams; 5, weight-holder; 6, balance-finger of the balance-beam; 7, dial-plate attached to the frame 1; 8, indicator-support of the frame; 9, upper section of the pressure-rod; 10, lower section of such rod; 11, adjusting-nut mounted on the threaded ends of the rod-sections 9 and 10; 12, threaded lock or jam-nut on rod-section 10; 13, indicator mounted on support 8 of the frame; 14, indicator-spring; 15, pencil-bar of the indicator; 16, indicator-drum, also section of table on which the device is placed.

An indicator-spring is used in the capacity of an offsetting or opposing medium to the forces or pressures brought to bear against the known area of a piston to which they are connected. The spring having embodied in its construction the elements that are used as an equivalent for the pressure brought to bear against it, and its ultimate showing in the form of a scale, the number of the divisions to the inch on such scale will determine the denomination of such spring. If it shows through the medium of the parallel motion of the indicator forty marks to the inch with a pressure of forty pounds per square inch on the piston, then it would be characterized as a forty-pound spring. It has been found in practice that springs under their various denominations are susceptible to changes of from four to eight per cent.—*i. e.*, springs constructed to represent a certain denomination are by a practical test in the indicator frequently found either of too light or too heavy a tension. If, for instance, a test for horse-power in an engine is made with a spring marked "Forty," which was two fortieths or two pounds in forty pounds, or five per cent. light, it is evident that the calculations would be five per cent. too much, and an engine showing at first five-hundred horse-power would in reality represent but four-hundred-and-seventy-five horse-power; also, if the spring was too heavy then the calculations would be short in horse-power. These errors in indicator-springs have frequently led to endless trouble and litigations.

As the denomination of springs in their construction is determined from their length and diameter, it is a well-known fact that two springs of the same dimensions will not show exactly the same denomination of power. My invention is intended to overcome this trouble and present to the user of the indicator the exact denomination of the spring, and whether such spring be light or heavy his calculations can be made accordingly from the well-known power of the spring as a factor.

My device consists of the beam 2, (see Figs. 1 and 3,) having its fulcrum-points 17 nicely balanced on the fulcrum-block 18, which block may be attached to or form a part of the frame 1. The fulcrum-points 19 (see Figs. 1 and 4) are provided at one end of the balance-beam 2 to engage within the eyes 20 of the forked end 21 of link 4. The eyes 22 of the forked end 23 of said link engage with the fulcrum-points 24 of the compound lever and scale-beam 3. One end of the beam 3, having the fulcrum-points 25, is fulcrumed to the block 26 of the frame 1. The pointed end of the lower rod-section 10 (see Fig. 2) is supported in the step 28 of the beam 2. The upper end 29 of rod 9 is also pointed and supports the cap 30.

To test a spring, the indicator containing such spring is attached by means of the coupling 31 (see Fig. 2) to the threaded support 8 of frame 1, the piston 32 resting on the pivoted cap 30 of the pressure-rod 9. The length of the combined rods 9 and 10, with reference to the balanced condition of beam 2, is regulated by means of the nut 11. When properly adjusted, all the parts will be in a balanced or normal condition or state of rest with the finger 6 at zero, as shown at Fig. 1. When thus balanced, the weight-holder 5 will also be at the zero-point on the scale-beam 3.

If a forty-pound spring is to be tested, its full range of pressure is to be considered. In this case I will suppose it to be eighty pounds—i. e., the maximum pressure per square inch for this spring is eighty pounds or eighty fortieths, or two inches. Now as the indicator-pistons of the present day are one-half square inch in area it is obvious that one-half of the actual pressure of the steam will be represented by dead-weight. Therefore to weigh this forty-pound spring would be to place twenty pounds dead-weight on the weight-holder 5 at the first position, or 1, on the scale-beam 3, which will represent forty pounds per square inch—i. e., the free end of the pencil-bar 15 will be carried up from zero to the line 33 one inch on the paper-drum 16. Forty pounds placed on holder 5 in position 1 on the scale-beam 3 will carry such pencil-bar two inches to line 34, which will equal eighty fortieths or eighty pounds. Any error of tension can be noted by measuring the distance of these lines from zero. If in testing, for instance, a forty-pound spring, with the weight-carrier in the position as above described, it was found that the pencil-bar was carried up on the paper-drum three fortieths above an inch, it would show an apparent error of three pounds, making the actual denomination of the spring thirty-seven pounds instead of forty, showing that eighteen and one-half pounds of dead-weight instead of twenty move the indicator-spring to show at the pencil-point of bar 15 a movement of one inch. If the spring were three fortieths too heavy, one inch travel of bar 15 would be accomplished by the application of twenty-one and one-half pounds of dead-weight on beam 3, or by moving the twenty-pound weight along the beam for the difference the denomination of such spring would be forty-three pounds instead of forty. By this method the actual denomination of the spring may be determined, and this fact established it is a simple matter for the operator to make correct calculations for the actual horse-power. If a one-hundred-pound spring is to be tested, fifty pounds would be applied at 1 on the scale-beam or twenty pounds at 4. By this arrangement light weights can be used to test heavy springs.

The indicator is shown attached to a projection of the frame. In place of such an arrangement, a separate pedestal could be erected near the end of the balance-beam to support such indicator, also the adjusting feature to place the spring of the indicator and the beams in a balanced condition, which consists of the pressure-rod in two sections. In place of such an arrangement the indicator-support could be so constructed that it could be raised and lowered, in which case the pressure-rod would be in one piece. These I consider mere mechanical changes and within the scope of my invention.

Having thus described my invention, what I claim as new, and wish to secure by Letters Patent, is—

1. The combination, in a device for testing the denomination of indicator-springs, of a balance-beam, a frame on which such beam is fulcrumed, an indicator-support on such frame, and an adjustable pressure-rod on the beam to connect such beam with the spring of the indicator, that by means of such connection the movement of the beam will be communicated directly to such indicator-spring, substantially as set forth.

2. The combination, in a device for testing the denomination of indicator-springs, of a balance-beam, a frame on which such beam is fulcrumed, an indicator-support on such frame, and a scale-beam fulcrumed to the frame and to the balance-beam, with an adjustable pressure-rod attached to the balance-beam to communicate the movement of such beam to the spring of an indicator mounted on the frame, substantially as set forth.

3. The combination, in a device for testing the denomination of indicator-springs, of a balance-beam, a frame on which such beam is fulcrumed, an indicator-support on such frame, and a scale-beam having a weight-carrier thereon, such beam fulcrumed to the frame and to the balance-beam, with a sectional pressure-rod supported on such beam, the sections of such rod adjustably connected together, that by means of such adjustment the beams may be brought into a balanced condition when the end of the pressure-rod is engaged with the indicator-spring and the balance-beam, substantially as set forth.

4. The combination, in a device for testing the denomination of an indicator-spring, of a balance-beam, a frame on which such beam is fulcrumed, an indicator-support on such frame, a scale-beam having a weight-carrier thereon, such scale-beam fulcrumed to the frame and to the balance-beam, with a pressure-rod in two parts or sections mounted on the balance-beam, said sections united by an adjusting-nut to regulate the length of such sections to the proper distance between the balance-beam and the spring of an indicator, which indicator is mounted on support of the frame, and means, substantially as shown, to lock such adjusting-nut in any position required, substantially as shown and set forth.

Signed at New York, in the county of New York and State of New York, this 13th day of May, A. D. 1890.

ALMON B. CALKINS.

Witnesses:
WILLIAM MOLLOY,
CHAS. A. RILEY.